(12) United States Patent
Schade

(10) Patent No.: US 11,360,931 B2
(45) Date of Patent: *Jun. 14, 2022

(54) DISJOINT ARRAY COMPUTER

(71) Applicant: INTERNATIONAL MICROSYSTEMS, INC., Fremont, CA (US)

(72) Inventor: Peter A. Schade, Milpitas, CA (US)

(73) Assignee: International Microsystems, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/324,726

(22) Filed: May 19, 2021

(65) Prior Publication Data

US 2021/0271629 A1 Sep. 2, 2021

Related U.S. Application Data

(63) Continuation of application No. 16/524,425, filed on Jul. 29, 2019, now Pat. No. 11,016,927, which is a
(Continued)

(51) Int. Cl.
*G06F 15/173* (2006.01)
*G06F 13/38* (2006.01)
(Continued)

(52) U.S. Cl.
CPC ........ *G06F 15/17362* (2013.01); *G06F 13/28* (2013.01); *G06F 13/385* (2013.01);
(Continued)

(58) Field of Classification Search
CPC .. G06F 15/17362; G06F 15/161; G06F 13/28; G06F 13/4221; H04L 67/1097
See application file for complete search history.

(56) References Cited

U.S. PATENT DOCUMENTS 5,155,851 A   10/1992 Krishnan
6,411,506 B1   6/2002 Hipp et al.
(Continued)

FOREIGN PATENT DOCUMENTS

WO   2010147590 A1   12/2010

OTHER PUBLICATIONS

Reiner Hartenstein, "A Decade of Reconfigurable Computing: a Visionary Retrospective", Proc. IEEE Conf. on Design, Automation and Test in Europe (2001).
(Continued)

*Primary Examiner* — Nam T Tran
(74) *Attorney, Agent, or Firm* — Brundidge & Stanger, P.C.

(57) ABSTRACT

A hierarchical array computer architecture comprised of a master computer connected to a plurality of node computers wherein each node has a memory segment. A high speed connection scheme between the master computer and the nodes allows the master computer or individual nodes conditional access to the node memory segments. The resulting architecture creates an array computer with a large distributed memory in which each memory segment of the distributed memory has an associated computing element; the entire array being housed in a blade server type enclosure. The array computer created with this architecture provides a linear increase of processing speed corresponding to the number of nodes.

13 Claims, 7 Drawing Sheets

Related U.S. Application Data continuation of application No. 15/953,588, filed on Apr. 16, 2018, now Pat. No. 10,366,047, which is a continuation of application No. 14/743,752, filed on Jun. 18, 2015, now Pat. No. 9,977,762.

(60) Provisional application No. 62/151,290, filed on Apr. 22, 2015.

(51) Int. Cl.

| | | |
|---|---|---|
| *G06F 13/42* | (2006.01) | |
| *G06F 13/28* | (2006.01) | |
| *G06F 15/16* | (2006.01) | |
| *G06F 15/17* | (2006.01) | |

(52) U.S. Cl.
CPC ...... *G06F 13/4221* (2013.01); *G06F 13/4265* (2013.01); *G06F 15/161* (2013.01); *G06F 15/17* (2013.01); *G06F 15/17331* (2013.01); *G06F 15/17337* (2013.01)

(56) References Cited

U.S. PATENT DOCUMENTS

| | | |
|---|---|---|
| 7,209,347 B2 | 4/2007 | Liang et al. |
| 7,412,544 B2 | 8/2008 | Gibson et al. |
| 7,715,207 B2 | 5/2010 | Behrens |
| 8,122,177 B1 | 2/2012 | Puranik |
| 2007/0016714 A1 | 1/2007 | Huotari et al. |
| 2009/0031051 A1 | 1/2009 | Nguyen |
| 2010/0174833 A1 | 7/2010 | Filer et al. |
| 2011/0196951 A1 | 8/2011 | Chen |
| 2012/0324067 A1 | 12/2012 | Hari et al. |
| 2014/0129681 A1 | 5/2014 | Gorilovsky |
| 2014/0143368 A1 | 5/2014 | Anderson |
| 2015/0364162 A1 | 12/2015 | D'Abreu |

OTHER PUBLICATIONS

Jurgen Sauermann, "A Parallel APL Machine", 1990 ACM 089791-371, pp. 342-347.
Bryan Schauer, "Multicore Processors—A Necessity", ProQuest, Discovery Guides, 2008.
Supplementary Extended European Search Report dated Dec. 7, 2018 from EP application No. 16784033.9.

DISJOINT ARRAY COMPUTER

CROSS-REFERENCE TO RELATED APPLICATIONS

This application is a Continuation under 35 U.S.C. § 120 of U.S. patent application Ser. No. 16/524,425, filed Jul. 29, 2019; which is a Continuation of U.S. Ser. No. 15/953,588, filed on Apr. 16, 2018; which is a Continuation of U.S. Ser. No. 14/743,752, filed on Jun. 18, 2015, which Claims Priority from Provisional Application Ser. No. 62/151,290, filed on Apr. 22, 2015. The disclosures of both applications are hereby incorporated herein by reference in their entireties.

FIELD OF THE INVENTION

The present invention relates generally to computer architecture and particularly to a hierarchical array computer.

BACKGROUND OF THE INVENTION

A specialized array of computers appeared in the early 21st century referred to as blade servers which are most often found in server farms processing web based data such as emails, as described in U.S. Pat. No. 6,411,506. The blades in blade servers are relatively small server computers grouped in a common chassis called a blade enclosure. In the typical blade enclosure, the blades share a common power supply and data bus which provides the means for the blades to receive and transmit data and commands. Also included in the blade enclosure is a switch server, sometimes called a management module, which acts as a job controller for the blades, as described in U.S. Pat. No. 7,209,347.

An example of a blade server is shown in FIG. 1. The blade chassis, 100, includes removable server blades 101a-n. The blades 101, share a common backplane 102 that provides blade power from a power source 103 and a shared communication bus 104 which is usually an Ethernet bus. All external commands and data are shared over the internal communication bus 104. One or more management modules 105 coordinate the server blade operations. An external connection of the communication bus 106 provides the blades with access to a common memory source 107 such as NAS (Network Attached Storage) storage. The blades 101a-n typically have their own private memory 108a-n for use in their local processing.

A modification to the server blade management module was a later addition to blade enclosures and was added to allow the server blades to access a common set of USB devices such as USB memory devices, as described in U.S. Pat. No. 7,412,544. In the cited patent, means are provided to connect each blade with a plurality of external USB device ports with a blade server management module acting as the bridge between the blades and the server blade enclosure USB host ports. Due to the multiple types of USB devices such as keyboards, mouse's, CD-ROM's, and USB sticks, the blade servers can take advantage of many additional functions. A simplified diagram of this use of external USB devices in a blade server is shown in FIG. 2. The additional I/O network of FIG. 2, I/O, plus additional hardware in the blade server management module, 105, allow USB devices 112a-m to communicate with the server blades 101a-n.

Although blade servers can be viewed as an array of computers, they are not considered an "array computer" which normally denotes a group of computers that are tightly coupled together both in hardware and software execution, as discussed in "A Decade of RCS" Proc. IEEE Conf. on Design, Automation and Test in Europe (2001). A primary distinction of an array computer is the "architecture" of the array which describes the interconnecting path between the different computing nodes making up the array.

The review article of array computer architectures in reference 4 presents the wide range of complex hardware and software implementations that are associated with past array processing solutions. A good example of an actual array processing computer is the parallel APL machine built around 1990 by Jurgen Sauermann, "A Parallel APL Machine" 1990 ACM 089791-371. FIG. 3 shows a simplified block diagram of the Sauermann machine. The Sauermann machine 300 has all the elements of an array computer in that a master processor 301 is tightly coupled to an array of slave processors 304 via a common communication network 303 and dual ported memory 302 that is shared been the master computer and the slave processors. The slave processors also connected to a network an array of FPGA's 305 that perform mathematical calculations. The Sauermann machine was dedicated to a specific task of processing programs written in the computer scripting language, APL. A few of the Sauermann machines were built and successfully used by the German Post office.

Although a successful project, the Sauermann machine architecture is not easily adapted to other applications. Its specialized hardware and software are typical of array processing. It is mentioned because the present invention grew out of an interest in the target application of the Sauermann machine and has led to our attempt to present an array processing architecture that can be widely used from both a software and hardware standpoint and at the same time provide an architecture which is highly adaptable for future advances in computer hardware and software.

In addition to arranging computing elements in large connected arrays, a more recent method has been to build single integrated processors which include multiple CPU cores, as described in "Multicore Processors—A Necessity" by Bryan Schauer (csa-discoveryguides-multicore review, 9-2008). Multi-core processors such as the ones available from Intel and AMD can greatly increase the speed of computation. But they require special hardware and software to take advantage of the multi core design. In addition, they suffer one major fault that increases the complexity of programming and slows computation; namely, the access of all cores to external storage is thru a single physical channel.

The primary goal of an array computer is to take the processing power of a single computer and create a machine with N computers whose processing speed is N times faster than a single computer. This simple goal has led to a wide variety of software and hardware solutions which have generally led to complex and or expensive solutions.

The current invention provides means for creating an array computer housed in a blade server type enclosure that achieves a linear gain in processing power with additional computing nodes while providing a simple programming model for array processing by using a hierarchical computer architecture with disjoint computing nodes and a novel distributed memory structure.

SUMMARY OF THE INVENTION

A hierarchical array computer architecture comprised of a master computer with a large segmented memory that is segmented using disjoint high speed data channels that connect the master computer to an array of computing nodes to which the memory segments are directly connected. The master computer maps the memory segments as an array of mass storage blocks wherein each memory segment is mapped exclusively to either the master computer or to the computing node to which the memory segment is directly connected.

The computing nodes act as servers waiting for commands from their client master computer and are used to process the data in their associated shared memory segment upon command from the master computer.

The described architecture can also be viewed as distributed storage in which each memory segment of the storage is exclusively accessible either by a master computer or only one member of an array of computing nodes. The multiple memory controllers which reside in the array of computing nodes provide exceptional memory access speed and an easily scalable storage array.

DETAILED DESCRIPTION

The present invention relates generally to computer architecture and particularly to a hierarchical array computer. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
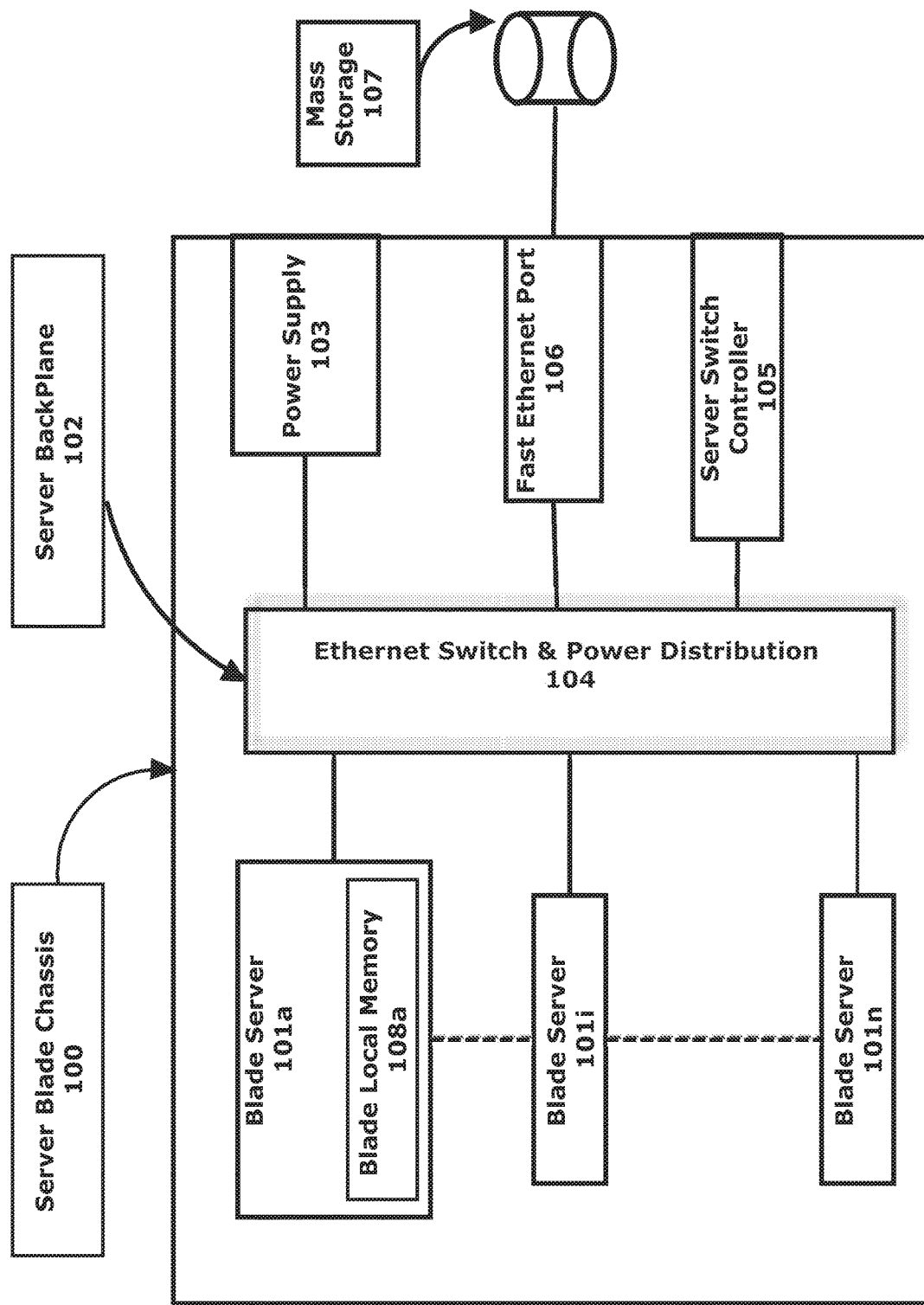
FIG. 1: Prior Art—A typical blade server enclosure.
Figure 2:
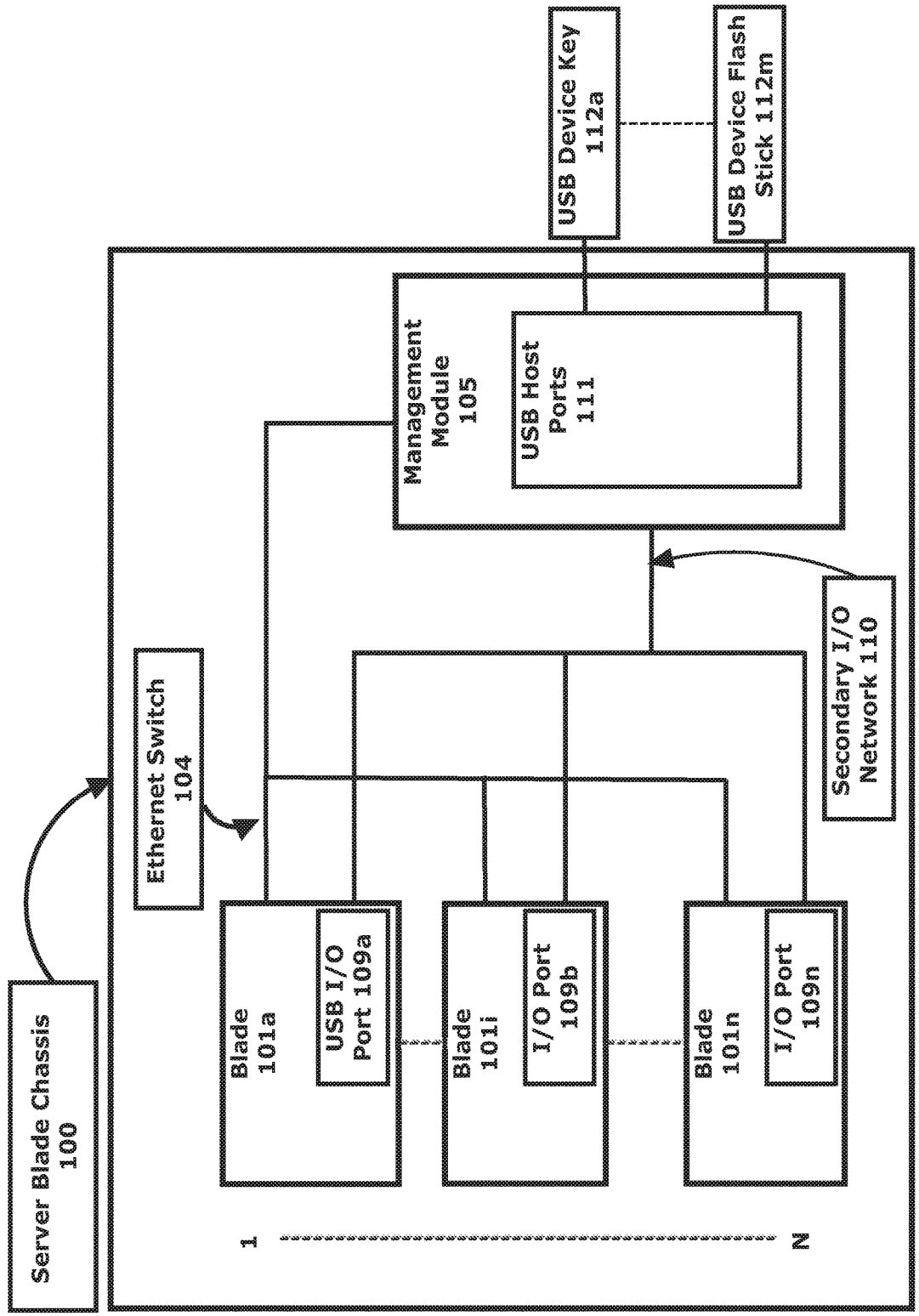
FIG. 2: Prior Art—A blade server which provides USB port access to the server blades.
Figure 3:
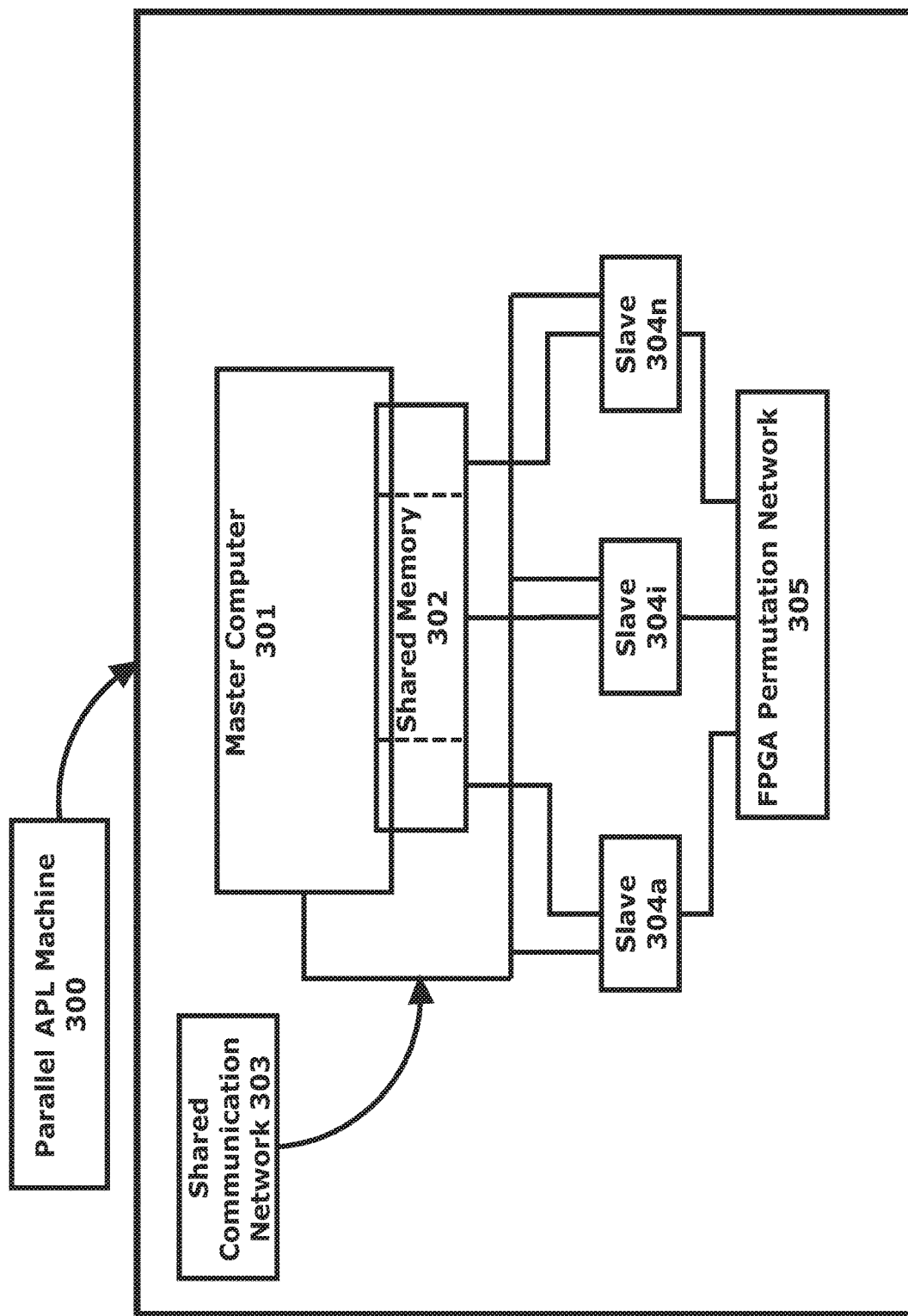
FIG. 3: Prior Art—The Sauermann Parallel APL Machine
Figure 4:
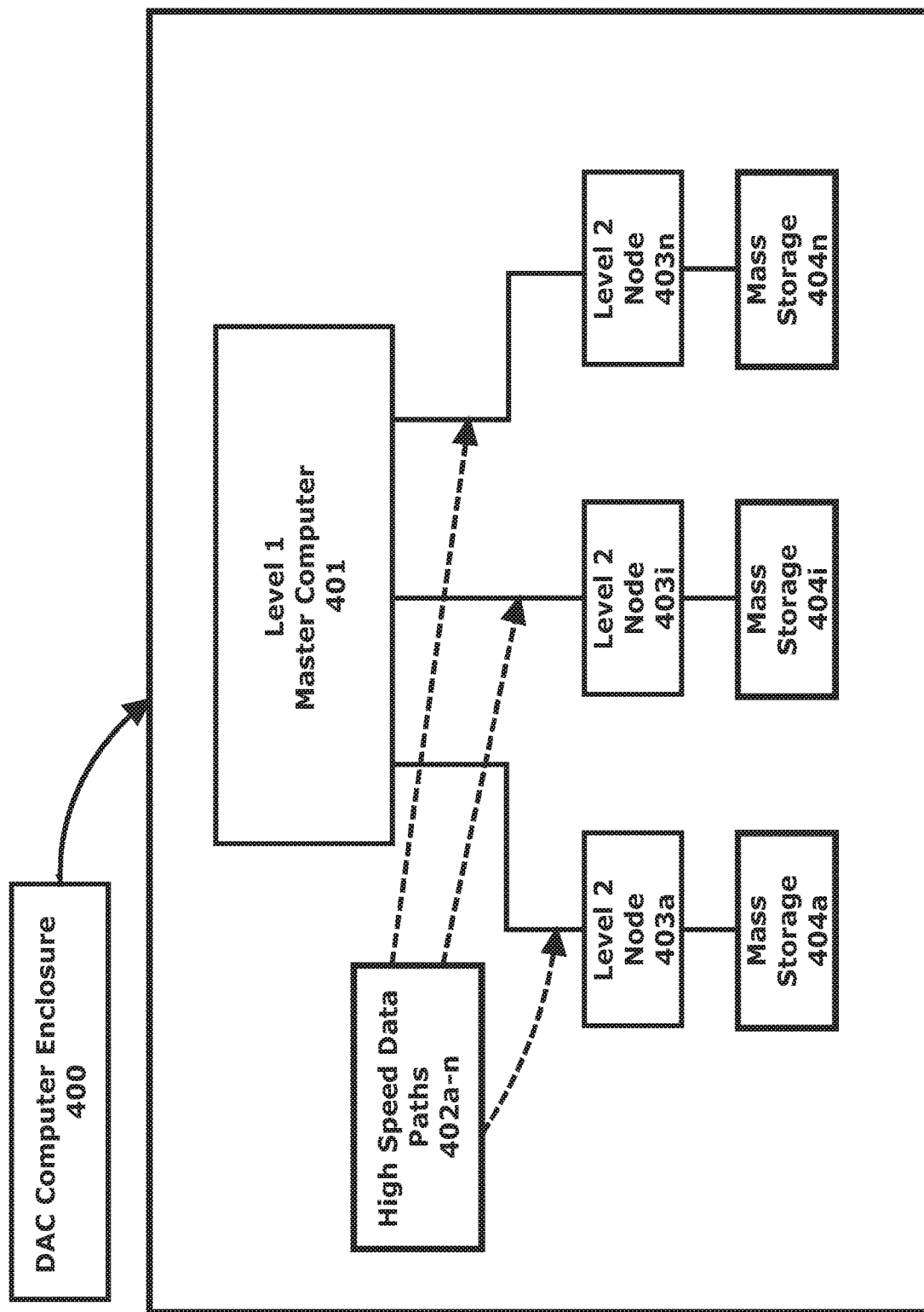
FIG. 4: DAC Computer Architecture showing the connection between the master computer and the node computers.

A short acronym, "DAC", will be used to describe the present invention. The name comes from the phrase, "Disjoint Array Computer", because a DAC computer is a parallel array computer wherein an array of computing nodes are connected to a master computer using high speed data channels that do not share a common bus. That is, the computing nodes are disjoint. FIG. 4 shows an embodiment of a hierarchical two level DAC computer 400.

In FIG. 4, the high speed data paths 402a-n provide the dual function of (a) a communication channel between the master computer and each of the node computer 403a-n, and (b) providing the master computer with N number of mass storage memory segments 404a-n. Each memory segment 404a-n is only addressable by either the master computer 401 or alternatively addressable by the individual computer nodes 403a-n. By using the communication channels 402a-n, the Master computer and the nodes which level of computing will have sole access the mass storage memory segments 404a-n. The DAC computer 400 of FIG. 4 provides a unique memory mapping structure in that it allows the creation of a large segmented memory for the level one master computer 401 whereby the memory segments are accessed using high speed disjoint data channels 402a-n connected to the computing nodes 403a-n.

Figure 5A:
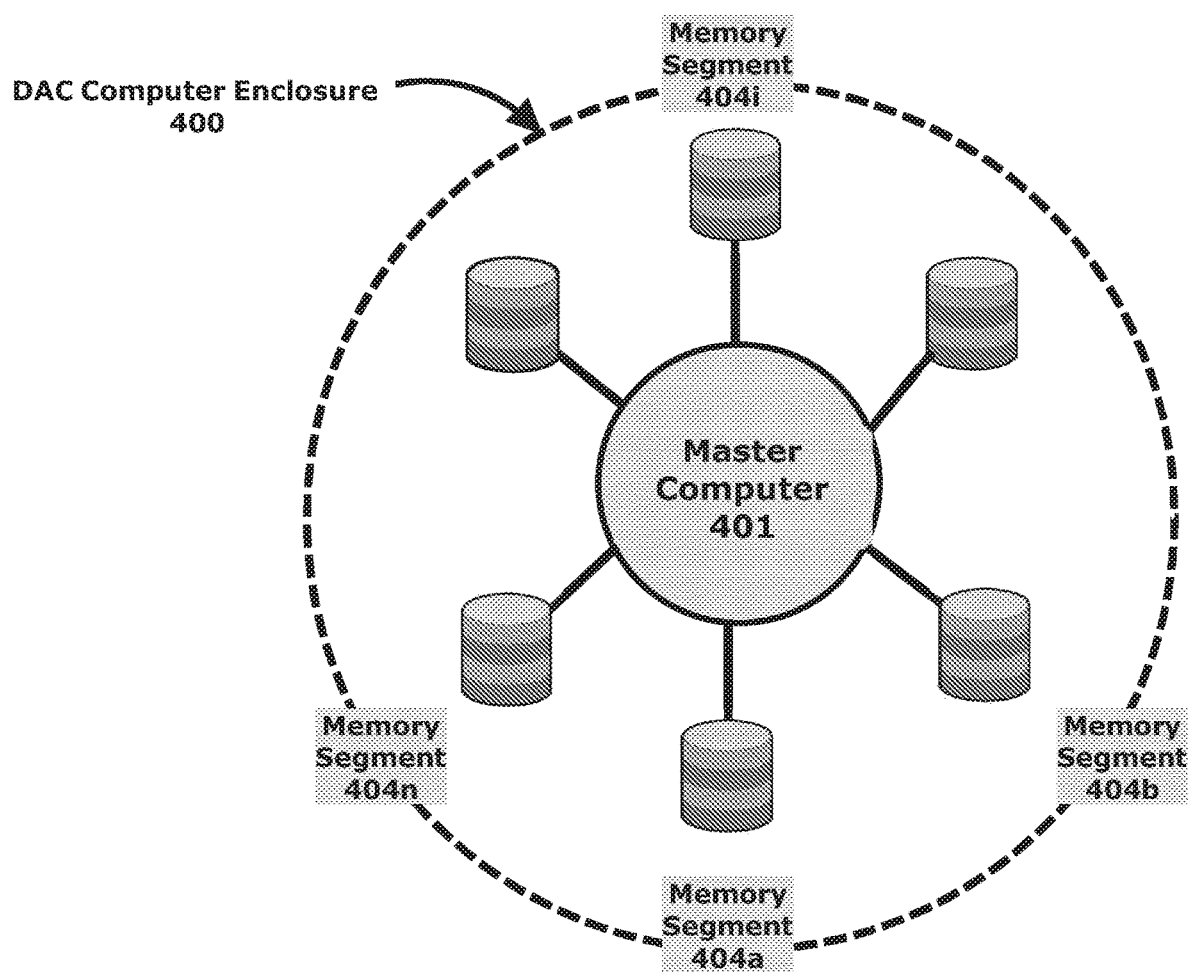
FIG. 5A: the DAC master computer being connected to an array of memory segments.
Figure 5B:
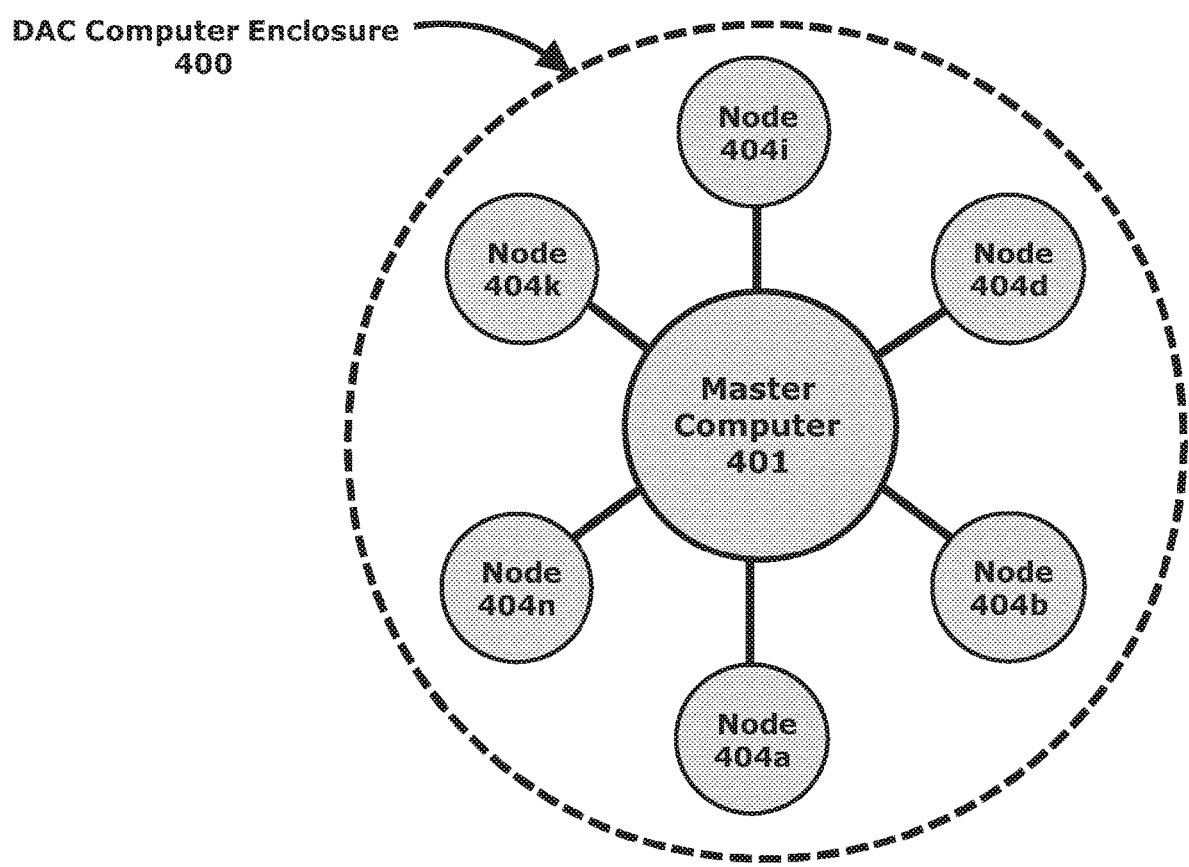
FIG. 5B: The DAC master computer being connected to an array of computing nodes.

FIG. 5A shows how the shared memory appears to the master computer when the master computer has sole access to all of the N number of memory segments. FIG. 5B shows how the master computer views the array of Level 2 nodes when all of the nodes have sole access to the memory segments.

This embodiment provides the means of creating a distributed mass storage architecture by allowing many multiple memory blocks each with its own controller to be viewed as a large distributed memory store controlled by one memory manager. Thus the DAC memory structure provides a memory store with a linear expansion capability using relatively small memory block increases. For example, if the DAC computer of FIG. 4 has 32 nodes each with 1 TB of SSD Flash drives and these are replaced by 4 TB of SSD drives, the total memory as seen by the level one DAC computer has increased from 32 TB to 256 TB.

A major benefit of such a distributed storage architecture with each memory segment having its own controller is that each memory segment can be accessed much faster than if the same amount of storage resided in one large store being accessed by a single memory controller.

A second major benefit is that the computing nodes are closely coupled to the data for which they are tasked to process and that this coupling excludes any conflict with any other node or the master computer.

The dual nature of the individual memory segments to be owned completely by either by the master computer or alternatively by an isolated computing node is an important element of the DAC design. It allows the software programs in both the master and node computers to completely own the memory upon which they are accessing and to not have to deal with interactive problems typically associated with multi-port memory.

The architecture described above and shown in FIG. 4 and FIGS. 5A and 5B is what we refer to as disjoint computing using disjoint memory.

Because the same area of the DAC shared memory of FIG. 4 should not be accessed at the same time by both the master computer 401 and one of the computing nodes 404, means must be provided between the master computer and any given computing node which allows the master computer to coordinate the exclusive access to the shared memory.

Figure 6:
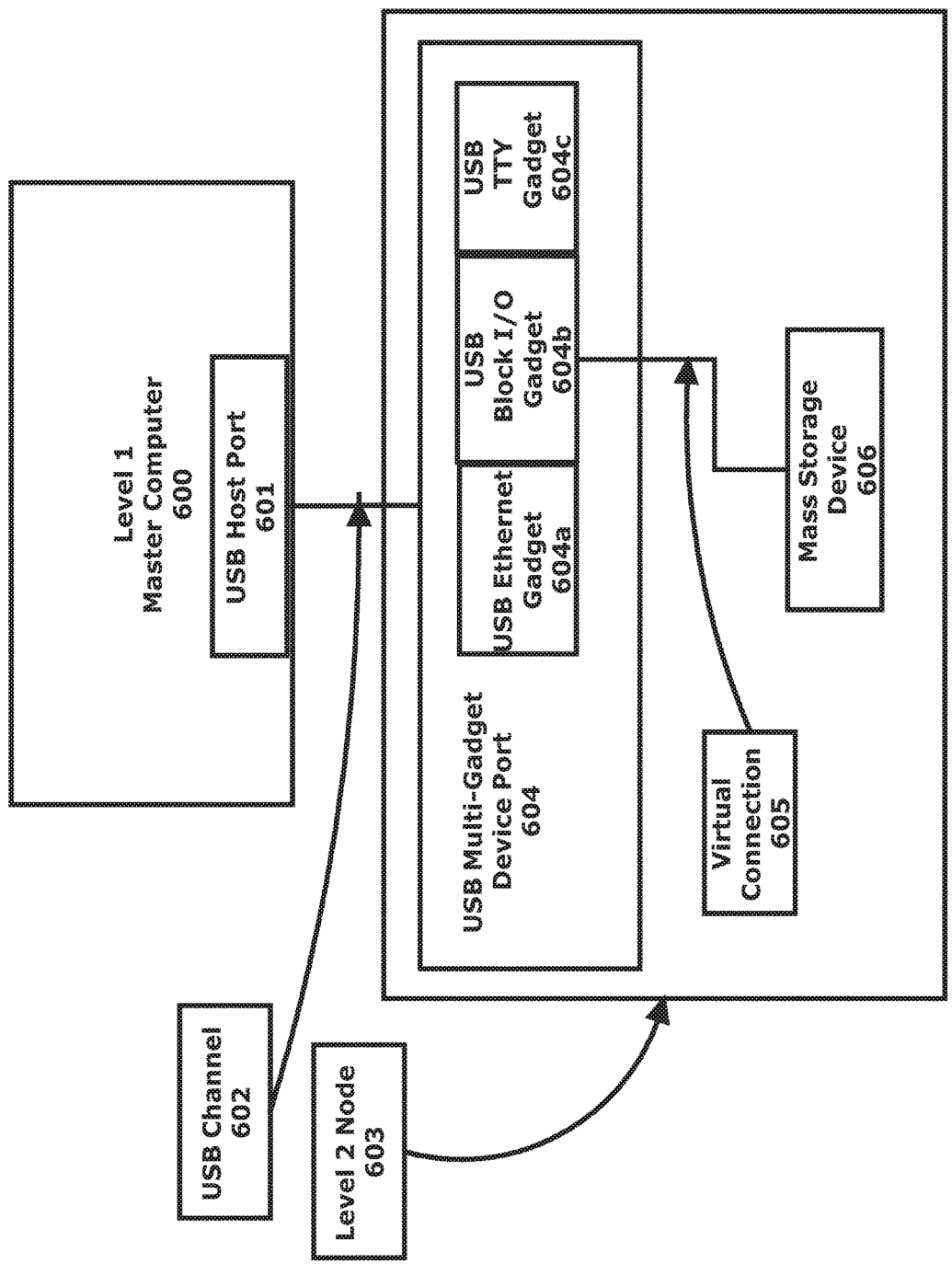
FIG. 6: The preferred embodiment of a two level DAC computer wherein a single USB multi-gadget channel between the level 1 master computer and each level 2 node computer provides both a storage link and communication link between the master computer and its connected node processor.

FIG. 6 shows a version of the preferred embodiment of FIG. 4 of the DAC computer architecture in which the high speed data channel between the level one computer 600 and a level 2 node 603 is USB serial channel 602. In this embodiment, the computing node USB device port 604 is connected to the master computer USB host port 601. The node USB device port driver supports a three way USB multi-gadget architecture that allows the master computer to view its USB host port 601 as being connected to three different USB gadgets; namely a memory storage block I/O device 604b, an Ethernet port 604a, and a TTY port 604c. In this particular embodiment, the USB block I/O device 604b is mapped to a physical storage drive of the computing node 606. The USB gadget virtual Ethernet port 604a can be used as the command channel between the master computer and the computing node. The USB gadget TTY port 604c can be used by the master computer to identify and initialize the computing node.

Although USB connections were used in the above embodiment to connect the master computer to the computing nodes, other physical buses with supporting software drivers could be used to connect the master computer to the node computers in a similar manner described above including the use of custom FPGA's connected to the respective PCIe buses on the master and node computers.

Web blade servers are often used to process high speed web traffic. The blade server architecture that was discussed earlier is similar to the preferred embodiment of the DAC computer shown in FIG. 4. Both implementations are normally designed to fit in a standard server rack. Both use a common power supply to power individual processing nodes. And both have a manager to control the processing nodes.

However, there are major differences between a standard web blade server and the preferred embodiments of the DAC computer which have been presented. The main communication channel of the blade server for data transfers is a high speed bus connected to all the blades including the blade management module. Alternatively, the DAC computer uses isolated data channels between its master computer and the computer nodes. In addition, the memory structure of the DAC computer is a novel storage memory that is used to provide both a large segmented memory for the DAC master computer and alternatively smaller main memory segments for the DAC computing nodes. And finally, the DAC nodes have no direct access to the external memory outside of the DAC computer enclosure whereas the Web Server blades directly address external memory through a network connection such as an Ethernet network.

The hierarchical DAC computer architecture achieves unparalleled simplicity in both hardware and software design by keeping complete orthogonality of the memory and communication between the DAC master computer and the DAC computing nodes.

In addition, the physical placement of the segmented storage memory at the computing nodes allows extremely large storage to be easily controlled by a multitude of memory controllers.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A disjoint array computer (DAC) system, comprising:
    a central computer communicatively connected to a plurality of disjoint node computers in a network by a plurality of disjoint communication channels,
        wherein only the central computer has direct access to each of the plurality of disjoint node computers via the plurality of disjoint communication channels, and
        wherein the central computer communicates commands, data, and status with the plurality of disjoint node computers via separate communication channels in which the commands, data, and status between the central computer and each disjoint node computer are not directly accessible from one disjoint node computer to another;
    wherein each disjoint communication channel is composed of a command channel and a data channel, wherein the command channel provides communication between the central computer and the disjoint node computers, and wherein the data channel provides the central computer access to a plurality of memory segments of the plurality of disjoint node computers;
    wherein a choice of exclusive access to each memory segment is solely determined by the central computer;
    wherein the plurality of disjoint node computers act as servers with a common client being the central computer; and
    wherein both the central computer and the plurality of disjoint node computers share an enclosure.

2. The DAC system of claim 1, wherein the separate communication channels between the central computer and the disjoint node computers are USB channels.

3. The DAC system of claim 1, wherein the separate communication channels between the central computer and the disjoint node computers are Ethernet channels.

4. The DAC system of claim 1, wherein the separate communication channels between the central computer and the disjoint node computers are PCIE channels.

5. The DAC system of claim 1, wherein any given memory segment of any disjoint node computer is accessible by the central computer or by the specific disjoint node computer via commands sent by the central computer over the disjoint command channel but is never directly accessible and completely isolated physically from all other disjoint node computers.

6. The DAC system of claim 1, wherein the central computer and the plurality of disjoint node computers are powered from a central power supply in the enclosure.

7. The DAC system of claim 1, further comprising a plurality of USB device ports residing on each of the plurality of disjoint node computers interfaced to a plurality of USB host ports on the central computer;
    wherein each of the plurality of USB host ports on the central computer are mapped to a memory segment on each of the plurality of disjoint node computers which is a physical memory store attached to each of the plurality of disjoint node computers.

8. The DAC system of claim 7, wherein the USB device ports of the plurality of disjoint node computers appear as USB multi-gadget devices to the central computer providing USB storage device(s) and USB communication channels to the central computer.

9. The DAC system of claim 8, wherein the multi-gadget USB devices on the plurality of disjoint node computers as seen by the central computer include Remote Network Driver Interface Specification (RNDIS) USB virtual Ethernet ports.

10. The DAC system of claim 8, wherein the multi-gadget USB devices on the plurality of disjoint node computers as seen by the central computer include CDC (Communications Device Class) ACM (Abstract Control Model) USB virtual serial ports.

11. The DAC system of claim 1, wherein the plurality of disjoint node computers use FPGA communication ports derived from FPGAs connected to PCIe ports residing on the plurality of disjoint node computers, the FPGA communication ports including communication ports compatible with the central computer;
    wherein the central computer accesses memory segments which are separately attached to each of the plurality of disjoint node computers.

12. The DAC system of claim 1,
- wherein a distributed storage memory architecture is created using a hierarchical computer architecture of the central computer communicatively connected to a plurality of disjoint node computers;
- wherein the plurality of disjoint node computers each has one or more storage devices that is mapped as separately addressable storage devices by the central computer; and
- wherein a collection of the plurality of disjoint node computers each having one or more storage devices forms a large distributed storage memory for the central computer.

13. The DAC system of claim 1, wherein the central computer is communicatively connected to an interface computer that provides access to external computer networks and translates structured data between external computer networks and the DAC system.

\* \* \* \* \*